(No Model.) 2 Sheets—Sheet 1.
H. A. CUSHMAN.
RUBBER TUBING MACHINE.
No. 579,938. Patented Mar. 30, 1897.
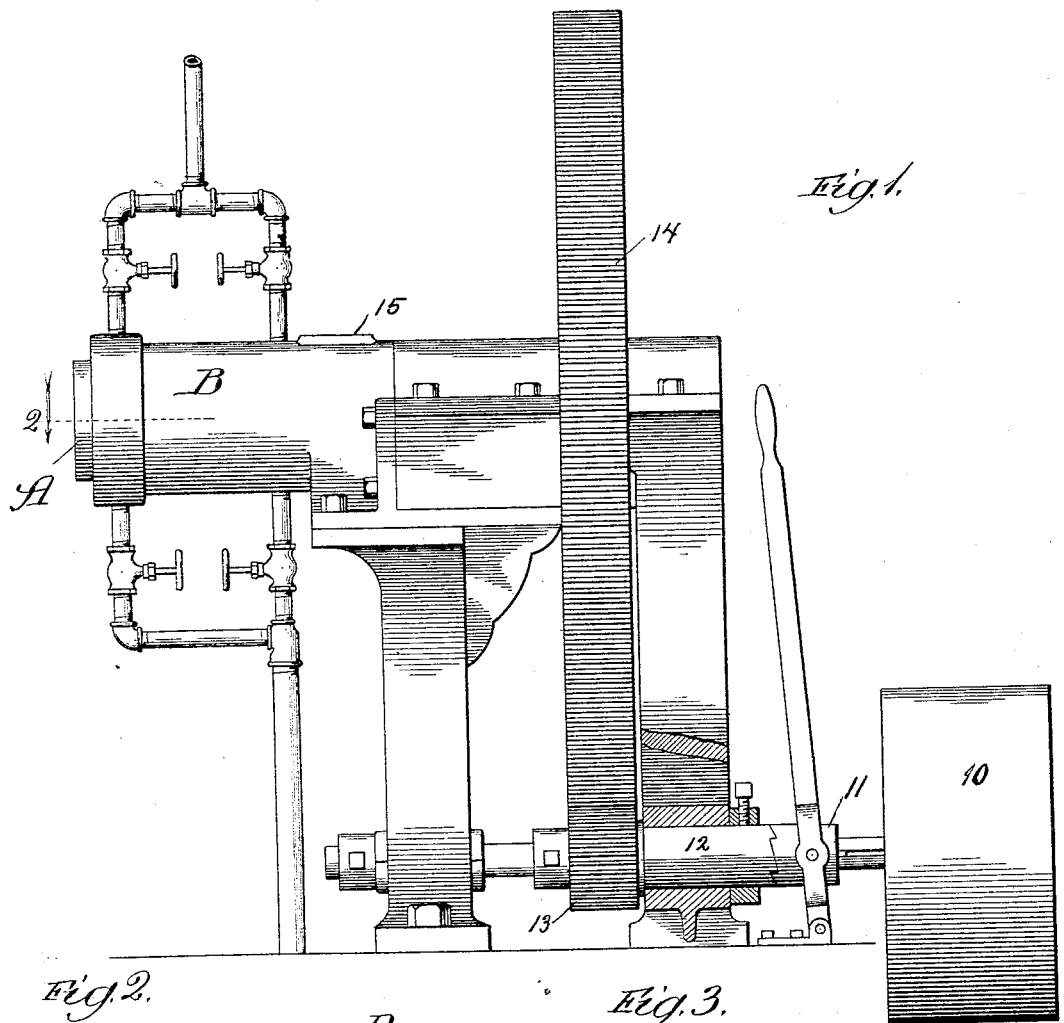
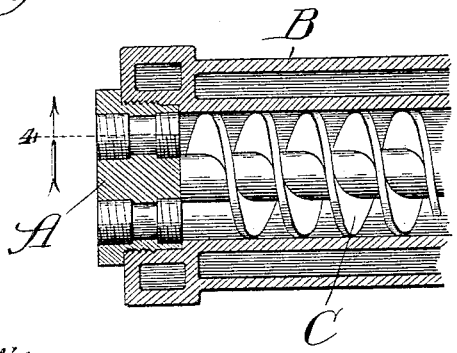
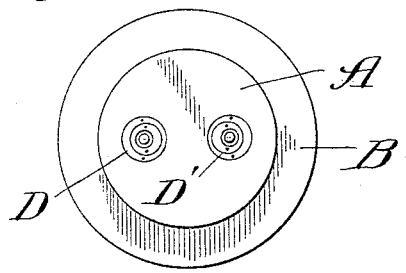
Witnesses:
Chas. E. Gaylord
Lute J. Peters
Inventor:
Henry A. Cushman
By Banning & Banning & Sheridan,
Attys (No Model.) 2 Sheets—Sheet 2.

H. A. CUSHMAN.
RUBBER TUBING MACHINE.

No. 579,938. Patented Mar. 30, 1897.

Witnesses:

Inventor:
Henry A. Cushman,
By Banning & Banning & Sheridan,
Attys.

UNITED STATES PATENT OFFICE.

HENRY A. CUSHMAN, OF CHICAGO, ILLINOIS, ASSIGNOR TO THE MECHANICAL RUBBER COMPANY, OF PASSAIC, NEW JERSEY.

RUBBER-TUBING MACHINE.

SPECIFICATION forming part of Letters Patent No. 579,938, dated March 30, 1897.

Application filed November 16, 1896. Serial No. 612,243. (No model.)

*To all whom it may concern:*

Be it known that I, HENRY A. CUSHMAN, a citizen of the United States, residing at Chicago, Cook county, Illinois, have invented certain new and useful Improvements in Rubber-Tubing Machines, of which the following is a specification.

My invention relates particularly to that class of machines in which rubber is fed into the same in a raw unvulcanized condition and forced out of the machine in the shape of a tube ready for vulcanization; and my invention has particular reference to that portion of the machine known as the "head"—the part which contains the dies that form the rubber tubing—and more especial reference to the means for adjusting the dies by which the thickness of the walls of the tubes may be controlled.

The object of my invention is to provide a simple, economical, and efficient head for rubber-tubing machines; and the invention consists in the features, combinations, and details of construction hereinafter described and claimed.

Figure 4:
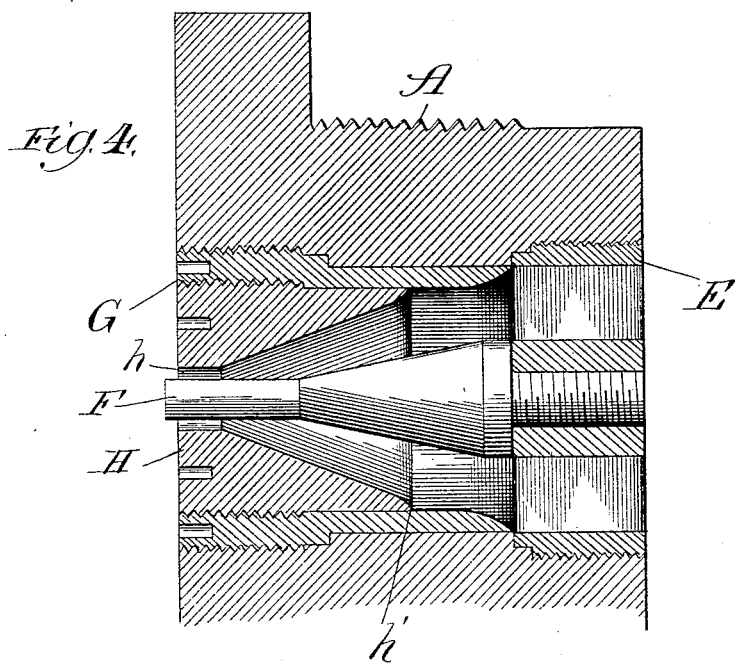
Figure 5:
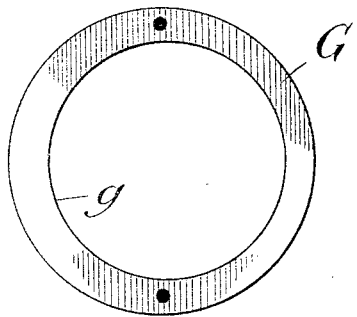
Figure 6:
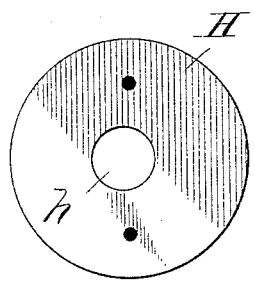
Figure 7:
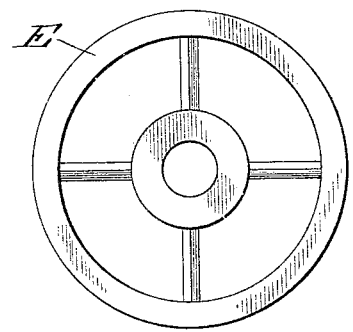

In the accompanying drawings, Figure 1 is a side elevation of a rubber-tubing machine with a portion thereof shown in section; Fig. 2, an enlarged sectional view of the head and feeding mechanism, taken on line 2 of Fig. 1; Fig. 3, an end elevation of the mechanism shown in Fig. 2; Fig. 4, a substantially full-sized longitudinal sectional view of one of the forming-dies, taken on line 4 of Fig. 2; Fig. 5, an end view of the outer adjusting-ring; Fig. 6, an end view of the inner adjusting ring or die proper; Fig. 7, an end view of the spider that sustains the central forming-pin; and Fig. 8, an end view of the parts— viz., the outer and central adjusting-rings and the pin assembled together, forming the completed die.

In the art to which this invention relates it is well known that considerable difficulty is encountered in the forming of the tubes, in that there is no economical or efficient method of adjusting the relation of the central pin and the outer wall so as to provide for the desired thickness of the walls or to provide for making a tube with walls of uniform thickness. My invention therefore is intended, primarily, to remove this objection and provide a head for a rubber-tubing machine having a die with an adjustable ring or shell by which the thickness of the tubing may be regulated during the process of forming the same.

While I have illustrated in Fig. 1 of the drawings a complete machine, it will be understood that this machine is well known by those skilled in the art, and I do not therefore herein attempt to give a complete description of the machine or of the process of manufacturing tubes further than is necessary to an understanding of my invention and to enable those skilled in the art to practice the same.

In constructing a head for a rubber-tubing machine in accordance with my improvements I make a head-piece or casting A, of the desired size and shape, and insert it in the end B of the tubing-machine in line with a screw C, which feeds the unvulcanized rubber into the head. This head portion is preferably provided with two dies D and D', which are in all respects similar to each other, so that a description of one die necessarily applies to the other. It will be noticed that these dies are arranged at a point eccentric to the center of the head or in line with the helical blade of the feed-screw, so that the rubber may be forced directly into the same.

In constructing the dies I make a spider E, which is provided with screw-threads on its outer circumference, arranged to enter a threaded opening on that side of the head portion which is located in the interior of the machine and adjacent to the feed-screw. This spider portion is provided with a pin F, arranged in the central part thereof, and having threaded engagement with the same, so that it may be removed for purposes of repair or renewal, as desired. This pin should be of such size as to form the bore of the rubber tubing. The spider, it will be noticed, not only forms a sustaining mechanism for the central pin, but having screw-threads on its circumference that enter a threaded opening in the head it provides for a rigid engagement of the parts, so that the pin can be moved in or out and still maintain its lateral rigidity.

To form the outer wall of the die and diametrically size the tubing, I provide an outer adjustable ring G, having threads on its outer circumference adapted to enter and engage with threads in an opening in the head portion opposite the spider. It will be noticed by inspecting Figs. 5 and 8 of the drawings that this outer adjusting ring is made eccentric—that is, its bore $g$ is eccentric with the outer circumference. This bore is provided with screw-threads and adapted to receive the die proper, H, which is also provided with a central apperture $h$ of the diameter required for the tubing to be formed. The central bore $h$ is eccentric with the outer circumference of the die proper, so that by turning the die in one direction or the other the location of the perforation is changed with relation to the pin.

By inspecting Fig. 4 it will be seen that the die proper has an inner knife-edge $h'$, which serves to guide and force the rubber toward the pin or die proper, no matter in what position the die is located. This enables the die proper to be moved in or out, or rotated without in any way impeding the manufacture of tubing by forming a shoulder or otherwise.

Figure 8:
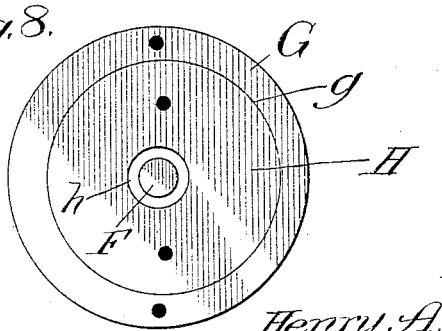

In Fig. 8 I have shown the parts assembled in end view and with the pin located in the exact center. If at any time or from any cause the relation of this pin with the bore of the die is changed, either by turning the outer ring or the die itself, such relation may be varied to suit circumstances and conditions.

In operation power is applied to the pulley 10, and by means of clutch 11 transmitted to sleeve 12 and spur-pinion 13, which engages with a gear-wheel 14 that drives the feed-screw C. The raw rubber is fed in through an opening at 15, where it is contacted by the feed-screw to be forced through the die, coming out of the die in the shape of a tube.

The advantages of my improvement will be manifest to those skilled in the art, and, briefly stated, may be summed up by saying that if for any cause or other, due to the different conditions of the rubber or the application of heat, the rubber should expand more on one side than on the other, or the pin be thrown out of the center, the parts may be realined simply and efficiently.

While I have described my invention with more or less minuteness as regards details and as being embodied in certain precise forms and adapted to certain specific uses, I do not desire to be unduly limited thereto any more than is pointed out in the claims. On the contrary, I contemplate all proper uses, changes in form, construction, and arrangement, the omission of immaterial elements, and substitution of equivalents, as circumstances may suggest or necessity render expedient.

I am aware of the Royle patent of August 11, 1891, No. 457,482, but my invention differs from the construction therein described in the means employed for holding and adjusting the die and otherwise. In the Royle construction the die is held and adjusted by set-screws and a clamp-nut, while in my construction the die is held and adjusted without the aid of any outside devices or appliances except the wrench used to turn the eccentric rings in adjusting, and in the Royle construction it is impossible to run more than one tube or use more than one die at a time, while in my construction, owing to the eccentric formation of the rings composing the die, the number that can be used is limited only by the size of the machine.

I claim—

1. In a machine of the class described, a head portion provided with a die in which there are combined a central pin for forming the bore of a rubber tube and an outer encircling wall for regulating the diameter of the tube, and means for adjusting the parts with relation to each other, substantially as described.

2. In a machine of the class described, a head portion provided with a die in which there are combined a spider carrying a central pin which forms the bore of the tube, and a die proper eccentrically and adjustably mounted in the head portion and surrounding the pin so that its adjustment changes the relation of the parts, substantially as described.

3. In a machine of the class described, a head portion carrying a die in which there are combined a spider having threaded engagement with the head portion, a central pin on such spider, a die proper screw-threaded in the head portion and encircling the pin, and means for changing the relation of the pin to the die proper, substantially as described.

4. In a machine of the class described, a head portion carrying a die in which there are combined a spider having threaded engagement with one end of the head and carrying a central pin that forms the bore of the tube, an eccentrically-adjustable ring screw-threaded in the opposite end of the head and surrounding the pin, and a die proper having threaded engagement with the adjustable ring with its bore arranged in eccentric relation to its circumference so that the parts may be adjusted with relation to each other, substantially as described.

5. In a machine of the class described, a head portion carrying a die in which there are combined a spider secured in the head portion, a central pin on such spider, an adjustable ring eccentrically mounted in the head portion, and a die proper eccentrically mounted in the adjustable ring surrounding the central pin and provided with an inner substantial knife-edge, substantially as described.

HENRY A. CUSHMAN.

Witnesses:
 DON C. BLANCHARD,
 EPHRAIM BANNING.